United States Patent
Robinson et al.

(10) Patent No.: US 9,291,500 B2
(45) Date of Patent: Mar. 22, 2016

(54) CONFIGURABLE COMBINATION SPECTROMETER AND POLARIZER

(71) Applicant: RAYTHEON COMPANY, Waltham, MA (US)

(72) Inventors: Ian S. Robinson, Redondo Beach, CA (US); John D. Bloomer, Redondo Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 179 days.

(21) Appl. No.: 14/166,995

(22) Filed: Jan. 29, 2014

(65) Prior Publication Data

US 2015/0211923 A1    Jul. 30, 2015

(51) Int. Cl.
*G01J 3/02* (2006.01)
*G01J 3/28* (2006.01)
*G01J 3/447* (2006.01)
*G01J 3/45* (2006.01)
*G01J 3/453* (2006.01)
*G01J 3/06* (2006.01)

(52) U.S. Cl.
CPC ............... *G01J 3/0224* (2013.01); *G01J 3/021* (2013.01); *G01J 3/027* (2013.01); *G01J 3/2823* (2013.01); *G01J 3/447* (2013.01); *G01J 3/45* (2013.01); *G01J 3/4535* (2013.01); *G01J 3/06* (2013.01); *G01J 2003/2826* (2013.01)

(58) Field of Classification Search
CPC ......... G01J 3/0224; G01J 3/021; G01J 3/027; G01J 3/2823; G01J 3/447; G01J 3/45; G01J 3/4535; G01J 3/06; G01J 3/2826; G01J 3/02; G01J 3/26; G01J 3/0208; G01J 3/10
USPC .......................................... 356/451, 452, 453
See application file for complete search history.

(56) References Cited

U.S. PATENT DOCUMENTS

| | | | | |
|---|---|---|---|---|
| 4,934,816 A | * | 6/1990 | Silver ..................... | G01J 3/02 250/343 |
| 5,045,701 A | * | 9/1991 | Goldstein ............... | G01J 3/447 250/339.07 |
| 5,166,749 A | * | 11/1992 | Curbelo ................. | G05B 19/39 318/640 |
| 5,253,110 A | * | 10/1993 | Ichihara ................. | G02B 27/09 355/53 |
| 5,345,306 A | * | 9/1994 | Ichimura ................ | G01N 21/17 356/451 |
| 5,528,368 A | * | 6/1996 | Lewis ..................... | G02B 21/33 250/339.02 |
| 6,122,023 A | * | 9/2000 | Chen ...................... | G02F 1/1334 348/E9.026 |
| 6,490,043 B1 | | 12/2002 | Kebabian | |
| 6,961,123 B1 | * | 11/2005 | Wang ...................... | G01J 4/04 356/364 |
| 7,016,040 B2 | | 3/2006 | Chen et al. | |
| 7,382,498 B1 | * | 6/2008 | Cook ...................... | G01J 3/02 356/326 |
| 7,742,173 B2 | * | 6/2010 | Yun ....................... | G01N 21/4795 356/479 |

(Continued)

FOREIGN PATENT DOCUMENTS

EP          2682741 A1      1/2014

OTHER PUBLICATIONS

Thériault, Jean-Marc et al., "A New Imaging FTS for LWIR Polarization Sensing: Principle and Application", Imaging and Applied Optics Technical Digest, 2011.

(Continued)

*Primary Examiner* — Mohamed K Amara
(74) *Attorney, Agent, or Firm* — Lando & Anastasi, LLP (57) ABSTRACT

A multimode configurable imaging spectropolarimeter in which the polarimetry function can be activated and deactivated on demand.

17 Claims, 8 Drawing Sheets

(56) References Cited

U.S. PATENT DOCUMENTS

| | | | | |
|---|---|---|---|---|
| 7,797,119 | B2* | 9/2010 | de Boer | A61B 5/0059 702/69 |
| 8,130,378 | B2* | 3/2012 | Wu | G01N 21/21 356/364 |
| 8,203,715 | B2 | 6/2012 | Robinson | |
| 8,334,982 | B2* | 12/2012 | Fang-Yen | G01N 21/45 356/497 |
| 8,705,046 | B2* | 4/2014 | Yun | A61B 5/0059 356/479 |
| 9,086,264 | B2* | 7/2015 | Wang | G01N 21/4795 |
| 2004/0104359 | A1* | 6/2004 | Komatsuda | G03F 7/70075 250/492.2 |
| 2005/0283058 | A1* | 12/2005 | Choo-Smith | A61B 5/0088 600/315 |
| 2007/0038040 | A1* | 2/2007 | Cense | A61B 3/1005 600/310 |
| 2007/0109553 | A1* | 5/2007 | Feldchtein | A61B 5/0066 356/492 |
| 2007/0146720 | A1* | 6/2007 | Cox | G01J 3/2823 356/451 |
| 2007/0165234 | A1* | 7/2007 | Podoleanu | A61B 3/102 356/451 |
| 2008/0043244 | A1* | 2/2008 | Hatori | G01B 9/02004 356/479 |
| 2008/0117431 | A1* | 5/2008 | Teramura | G01B 9/02004 356/511 |
| 2008/0285043 | A1* | 11/2008 | Fercher | A61B 3/102 356/451 |
| 2010/0002241 | A1* | 1/2010 | Hirose | A61B 3/102 356/497 |
| 2010/0018289 | A1 | 1/2010 | Oda | |
| 2010/0141954 | A1* | 6/2010 | Kobayashi | G01B 9/02007 356/479 |
| 2010/0149533 | A1* | 6/2010 | Fest | G01J 4/00 356/367 |
| 2010/0166293 | A1* | 7/2010 | Sugita | A61B 3/102 382/154 |
| 2010/0290053 | A1* | 11/2010 | Robinson | G01J 3/02 356/451 |
| 2011/0228222 | A1* | 9/2011 | Kobayashi | A61B 3/102 351/206 |
| 2011/0255095 | A1* | 10/2011 | Jiang | G01B 9/02004 356/479 |
| 2011/0267340 | A1* | 11/2011 | Kraus | A61B 3/102 345/419 |
| 2011/0273668 | A1* | 11/2011 | Hirose | A61B 3/102 351/206 |
| 2012/0200859 | A1* | 8/2012 | Breitenstein | A61B 3/102 356/479 |
| 2013/0003077 | A1* | 1/2013 | Suehira | A61B 3/102 356/479 |
| 2013/0107277 | A1* | 5/2013 | Hirose | A61B 3/102 356/512 |
| 2013/0301006 | A1* | 11/2013 | Kim | A61B 3/102 351/206 |
| 2013/0338510 | A1* | 12/2013 | Tearney | A61B 5/0066 600/478 |
| 2014/0078298 | A1* | 3/2014 | Kudenov | G01J 3/2803 348/135 |
| 2014/0176963 | A1* | 6/2014 | Kemp | G01B 9/02004 356/497 |
| 2014/0192364 | A1* | 7/2014 | Yatagai | A61B 3/102 356/491 |
| 2015/0168210 | A1* | 6/2015 | Dorschner | G01J 1/0429 349/18 |

OTHER PUBLICATIONS

U.S. Appl. No. 13/450,371, titled "Infrared Spectrometer with Enhanced Readout Speed," filed Apr. 18, 2012.
Vandervlugt, Corrie et al., "Ground Vehicle Spectral and Polarization Imaging Sensor", College of Optical Sceinces.
Dignam et al., "Analysis of a Polarizing Michelson Interferometer for Dual Beam Fourier Transform Infrared, Circular Dichroism Infrared, and Reflectance Ellipsometric Infrared Spectroscopies", Applied Spectroscopy, The Society for Applied Spectroscopy. Baltimore, US, vol. 35, No. 2, Mar. 1, 1981, pp. 186-193.
Goldstein et al., "Infrared Spectropolarimetry", Optical Engineering, Soc. of Photo-Optical Instrumentation Engineers, Bellingham, vol. 28, No. 2, Feb. 1, 1989, pp. 121-122.

* cited by examiner

CONFIGURABLE COMBINATION SPECTROMETER AND POLARIZER

BACKGROUND

Imaging spectroscopy is widely used in remote sensing applications. One type of interferometric spectrometer used to supply spectral data for many remote sensing applications is called a Fourier Transform Spectrometer (FTS). A common form of an FTS employs a Michelson interferometer with one arm having a variable optical path length. The variable optical path length may be implemented using a movable mirror. By scanning the movable mirror over some distance, an interference pattern or interferogram is produced that encodes the spectrum of the source. The FTS uses the Discrete Fourier Transform (DFT) or its faster algorithm, the Fast Fourier Transform (FFT), to convert the auto-correlation (each spectral amplitude encoded as the amplitude of a cosine signal) to physical spectra. The encoded spectrum is the Fourier transform of the source.

Figure 1A:
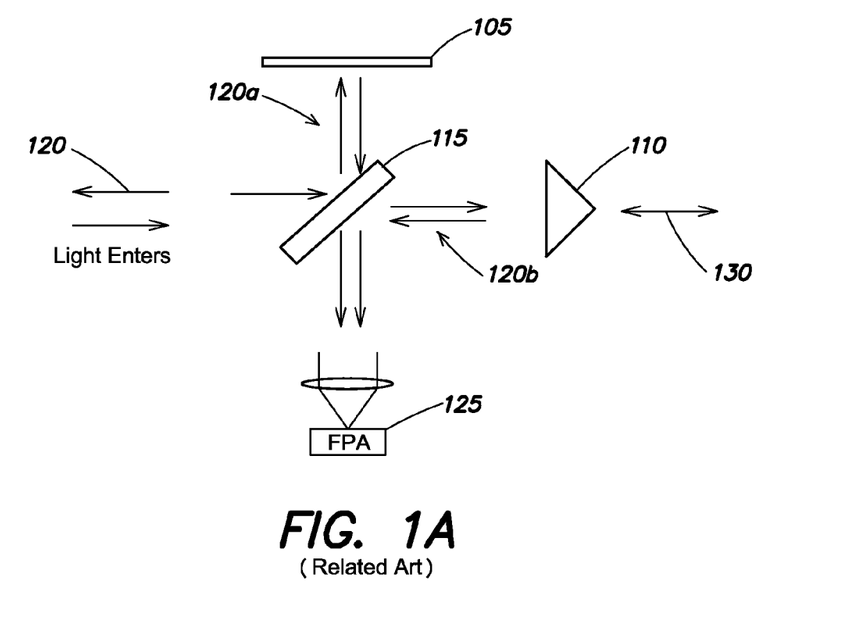
FIG. 1A is a block diagram of one example of a conventional interferometric spectrometer.

Referring to FIG. 1A, there is illustrated a block diagram of one example of an optical configuration of a conventional FTS using a scanning Michelson interferometer implemented with a movable mirror. In this example, the FTS includes two mirrors 105, 110 with a beamsplitter 115 positioned between them. Mirror 105 is a fixed mirror and mirror 110 is a movable mirror. Electromagnetic radiation 120 incident on the beamsplitter 115 from a radiation source (not shown) is divided into two parts, each of which propagates down one of the two arms and is reflected off one of the mirrors. Radiation 120a in a first optical path is reflected by the beamsplitter 115 and reflected by the fixed mirror 105. On the return, the radiation 120a is again split by the beamsplitter 115, such that 50% of the radiation is reflected back to the input, and the remainder is transmitter through the beamsplitter to a focal plane array 125. Radiation 120b in a second optical path is transmitted through the beamsplitter 115, and reflected by the movable mirror 110 which imparts a modulation to the radiation (motion of the mirror 110 is indicated by arrow 130). On the return, the radiation 120b is split by the beamsplitter 115 such that 50% of the radiation is transmitted through the beamsplitter back to the input, and the remainder is reflected to the focal plane array 125. The two beams are recombined at the focal plane array 125. When the position of the movable mirror 110 is varied along the axis of the corresponding arm (indicated by arrow 130), an interference pattern, or interferogram, is swept out at the focal plane array 125 as the two phase-shifted beams interfere with each other.

Figure 1B:
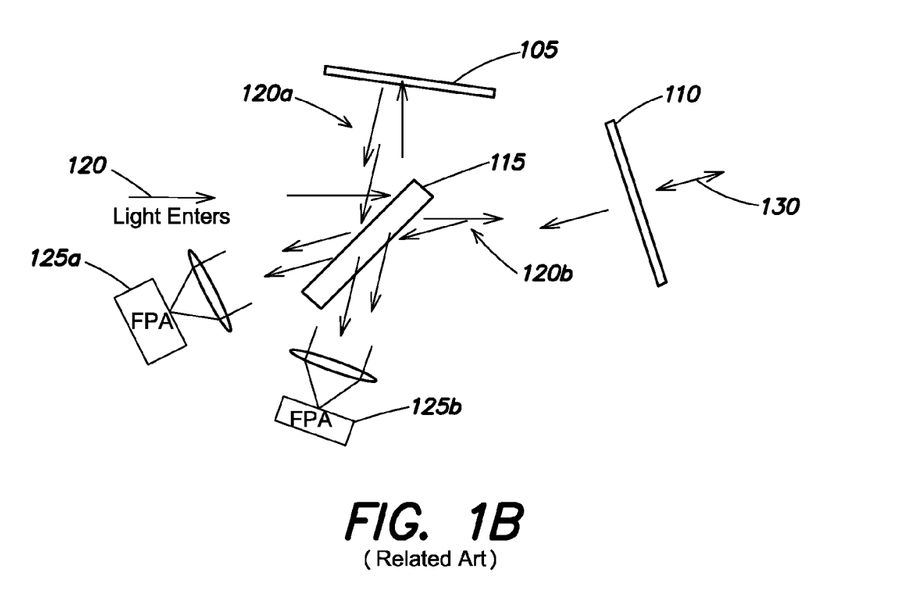
FIG. 1B is a block diagram of another example of a conventional interferometric spectrometer.

FIG. 1B illustrates an alternative configuration of an FTS. In this configuration, two focal plane arrays 125a, 125b are used, and the fixed mirror 105 and moving mirror 110 are oriented such that approximately 50% of the radiation 120a, 120b from each optical path is directed to each focal plane array. The spectra from each focal plane array 125a, 125b may be averaged to improve the overall signal-to-noise ratio. This configuration avoids the 50% radiation loss associated with the configuration of FIG. 1A, but is more complex and requires additional components.

Figure 2:
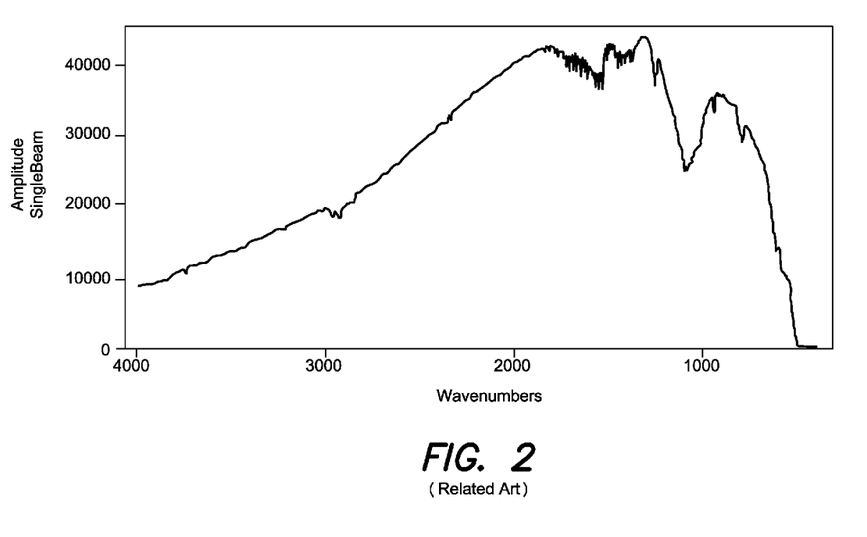
FIG. 2 is a graph of signal amplitude as a function of wavenumber, as may be obtained using an example of the interferometric spectrometer of FIG. 1A.

As discussed above, in the example FTS configuration of FIG. 1A, the focal plane array 125 receives a modulated interferogram; the modulation being caused by the motion of the movable mirror 110. The focal plane array 125 converts the modulated interferogram to spectral information by measuring the amplitude of cosines at specific frequencies. In the configuration of FIG. 1B, each focal plane array 125a, 125b receives an identical modulated interferogram. The focal plane array(s) converts the modulated interferogram to spectral information by measuring the amplitude of cosines at specific frequencies. FIG. 2 is a graph illustrating an example of the output from the focal plane array 125. The amplitude of each measured frequency (f) is proportional to the amplitude of an incident wavenumber of radiation, v, according to $f = 2vV$, where V is the velocity of the movable mirror 110. This formula, hereinafter referred to as "Equation (1)," describes that for each incident wavenumber, there is a corresponding interferogram frequency for a given mirror velocity. The graph illustrated in FIG. 2 corresponds to the following example: an input waveband of approximately 8.3-14.3 micrometers ($\mu$m) (corresponding to an input wavenumber range of 1200-700 $cm^{-1}$); a mirror velocity, V, of 0.05 centimeters per second (cm/s), a two second scan, a scan resolution of approximately 10 $cm^{-1}$, and a sample rate of greater than 120 Hertz (Hz). For this example, Equation (1), $f = 2vV$, yields a measured frequency range of approximately 35-60 Hz.

Polarimetry, or measurement of polarized electromagnetic radiation, may also provide useful information about an object, and typically provides at least some different information than is obtained by spectral imaging. In particular, polarimetry is sensitive to the object orientation, composition, and surface roughness, whereas, spectral information is primarily related to material composition. Therefore, in certain applications, it may be desirable to perform both spectral imaging and polarimetry.

Figure 3:
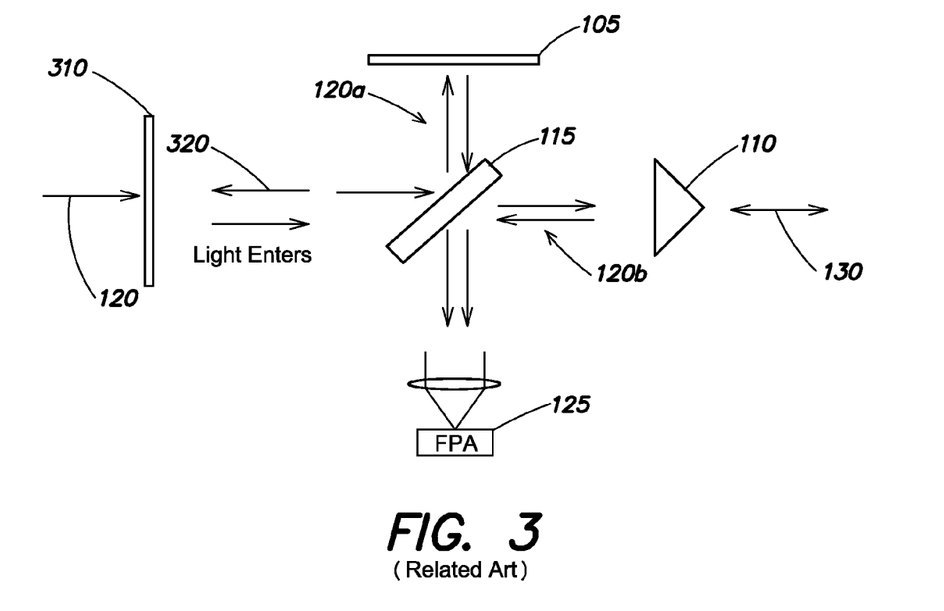
FIG. 3 is a block diagram of one example of an imaging transform spectrometer including a polarizer inserted in the input optical train.

Referring to FIG. 3, an FTS can be converted into a combined spectral imager and polarimeter (spectropolarimeter) by inserting a polarizer 310 into the optical path of the incident electromagnetic beam. Thus, polarized electromagnetic radiation 320 is provided to the FTS and analyzed as described above. The polarizer 310 may be switchable, such that the polarization of the incident electromagnetic radiation may be changed (e.g., from vertical or horizontal, or vice versa). With this arrangement, different polarizations are input, one at a time, to the FTS. Thus, the FTS measures one interferogram at a time (e.g., for either vertical or horizontal polarization). For the configuration illustrated in FIG. 3, the focal plane array 125 receives only $\frac{1}{8}^{th}$ of the original, unpolarized input radiation 120 because there is a 50% light loss due to transmission through the beamsplitter 115, as discussed above, and the focal plane array 125 measures one polarization (with half the available signal) for half the total time (assuming both polarization measurements will be made). Thus, this arrangement is very inefficient in terms of photon collection efficiency and is susceptible to errors if the object or scene being measured undergoes changes while the inserted polarizer is switched. If the polarizer is not switched then the instrument only measures information in one polarization.

SUMMARY OF INVENTION

Aspects and embodiments are directed to a configurable combination imaging transform spectrometer and polarimeter that is capable of dynamically turning on and off the polarimetry function. Additionally, as discussed in more detail below, the polarimetry function is implemented "within" the spectrometer, rather than using a polarizing filter placed at the input to the system (as is sometimes done conventionally), thereby avoiding any additional signal loss at the system input.

According to one embodiment, a multimode configurable imaging spectropolarimeter comprises a first beamsplitter configured to split incident electromagnetic radiation from a scene into a first optical path and a second optical path, a movable first mirror positioned in the first optical path and configured to reflect electromagnetic radiation in the first optical path, the first mirror being movable over a first scan range to provide a first optical path length difference between the first optical path and the second optical path, a polarizing beamsplitter positioned in the second optical path and configured to split electromagnetic radiation in the second optical path into a first polarization and a second polarization, the first and second polarizations being orthogonal to one another, a movable second mirror positioned in the second optical path and configured to reflect the first polarization, the movable second mirror being selectively movable over a second scan range to provide a second optical path length difference between the first and second polarizations, and at least one focal plane array sensor configured to receive electromagnetic radiation from the first and second optical paths and to produce a first interferogram corresponding to the first polarization and a second interferogram corresponding to the second polarization and superimposed on the first interferogram, with a frequency offset between the first and second superimposed interferograms.

In one example, the first interferogram comprises a first range of measured frequencies corresponding to one polarization and the second interferogram comprises a second range of measured frequencies corresponding to the second polarization, and wherein the frequency offset between the first and second ranges of frequencies is selected such that the first and second ranges of measured frequencies do not overlap. The first and second polarizations may be vertical polarization and horizontal polarization, for example. In one example, the at least one focal plane array sensor includes two focal plane arrays sensors each configured to receive the electromagnetic radiation from the first and second optical paths. The multimode configurable imaging spectropolarimeter may further comprise a first bandpass filter positioned in front of a first one of the two focal plane array sensors and having a first passband of wavelengths, and a second bandpass filter positioned in front of a second one of the two focal plane array sensors and having a second passband of wavelengths different from the first passband of wavelengths. The multimode configurable imaging spectropolarimeter may further comprise a fixed third mirror positioned in the second optical path, wherein the polarizing beamsplitter is configured to direct the first polarization to the movable second mirror and to direct the second polarization to the third mirror. In one example, the polarizing beamsplitter is configured to transmit the first polarization and to reflect the second polarization. The multimode configurable imaging spectropolarimeter may further comprise a controller configured to selectively interrupt a scanning movement of the movable first mirror and the movable second mirror, and to impart a vibration to one of the first and second mirrors so as to substantially prevent formation of the first and second interferograms at the at least one focal plane array sensor.

Another embodiment is directed to an imaging method comprising acts of receiving electromagnetic radiation from a scene with an imaging transform spectrometer, splitting the electromagnetic radiation into a first optical path and a second optical path within the imaging transform spectrometer, splitting electromagnetic radiation in the second optical path into first and second orthogonal polarizations, selectively producing first and second superimposed interferograms on a focal plane array sensor by selectively controlling movement of a movable first mirror in the first optical path to produce a first optical path length difference between the first and second optical paths, the first interferogram corresponding to the first polarization and the second interferogram corresponding to the second polarization, and selectively producing a frequency offset between the first and second superimposed interferograms by directing the first polarization to a movable second mirror, and selectively controlling movement of the movable second mirror in the second optical path to produce a second optical path length difference between the first and second polarizations.

In one example, the imaging method further comprises configuring the imaging transform spectrometer between a spectral imaging mode and a spectropolarimetric imaging mode by deactivating the movement of the movable first mirror to configure the imaging transform spectrometer into the spectral imaging mode, and activating the movement of the movable first mirror to configure the imaging transform spectrometer into the spectropolarimetric imaging mode. In another example, the imaging method further comprises configuring the imaging transform spectrometer into a broadband spatial imaging mode by deactivating the movement of the movable first mirror, deactivating the movement of the movable second mirror, and imparting a vibration to one of the first mirror and the second mirror to substantially prevent formation of the first and second interferograms at the at least one focal plane array sensor. In one example, splitting the electromagnetic radiation in the second optical path into the first and second orthogonal polarizations includes splitting the electromagnetic radiation in the second optical path into a vertical polarization component and a horizontal polarization component. In another example, splitting the electromagnetic radiation in the second optical path into the first and second orthogonal polarizations includes reflecting the second polarization from a polarizing beamsplitter, and transmitting the first polarization through the polarizing beamsplitter to the movable second mirror, wherein selectively producing the frequency offset further includes reflecting the first polarization with the movable second mirror. In another example, splitting the electromagnetic radiation in the second optical path into the first and second orthogonal polarizations includes directing the first polarization to the movable second mirror using a polarizing beamsplitter, directing the second polarization to a third fixed mirror, and reflecting the second polarization with the third fixed mirror. The first interferogram may comprise a first range of measured frequencies and the second interferogram may comprise a second range of measured frequencies. In this example, selectively producing the frequency offset includes producing a sufficient frequency offset such that the first and second ranges of measured frequencies do not overlap.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

A sensor combining imaging spectrometry and polarimetry may provide powerful dual (orthogonal) phenomenologies to detect targets and reduce or eliminate false alarms. Conventional spectropolarimeters have low efficiency, and measure different polarizations sequentially or using separate focal plane arrays, which leads to spatial registration problems between the images measured in different polarizations. In addition, conventional spectropolarimeters suffer from issues with sensitivity and dividing the incoming signal into different wavebands and polarizations. Aspects and embodiments are directed to spectropolarimeters, based on imaging transform spectrometers, which are capable of providing "on demand" polarimetry featuring two simultaneous, perfectly registered polarization measurements. As discussed in more detail below, certain embodiments provide a method of modulating a mirror in the imaging transform spectrometer to "frequency shift" one polarization to a different set of frequencies, such that each polarization has a unique frequency band and both polarizations may be detected on a single focal plane array.

As discussed above, an imaging transform spectrometer, such as a Fourier transform spectrometer (FTS), uses a moving mirror to modulate an interferogram. In conventional Fourier transform spectrometers, Fourier analysis is used to covert this modulation into spectral information. Referring to FIGS. 1A and 1B, for unpolarized input light 120, the focal plane array(s) 125, or 125a, 125b, records two superimposed modulated interferograms; one of each of the two orthogonal polarization components (e.g., horizontal and vertical) of the input scene radiation, with coincident modulation frequencies for the respective polarizations. Conventionally there has not been a way to separate these superimposed modulated interferograms and the conventional analysis reports an amplitude value which is the sum of the two interferograms. According to certain embodiments, a unique modulation is imparted to one polarization, such that the one or more focal plane arrays receive two superimposed modulated interferograms, but where there is a frequency offset between all the frequencies of the spectra measured in the respective polarizations. In this manner, the interferograms may be separated, and the separate polarization measurements recovered in addition to the spectral information. As discussed in more detail below, both polarizations may be perfectly registered on each pixel of the focal plane array, and are measured simultaneously.

Aspects and embodiments disclosed herein may be applied to conventional Fourier transform spectrometers, or to other types of imaging spectrometers that use alternative methods (other than classic Fourier analysis) to convert the modulation into spectral information. For example, aspects and embodiments may be advantageously applied to the imaging spectrometer forms disclosed in commonly-owned U.S. Pat. No. 8,203,715 (hereinafter the '715 patent, and which is herein incorporated by reference in its entirety for all purposes) because the methods of retrieving spectral information disclosed in the '715 patent may be more robust to aliasing that classic Fourier analysis, and may therefore be particularly useful for recovering the distinct frequencies according to embodiments disclosed herein. Aspects and embodiments permit collection of spectropolarimetry using Michelson-type transform spectrometers, optionally with the use of uncooled bolometer focal plane arrays (for infrared measurements).

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 4:
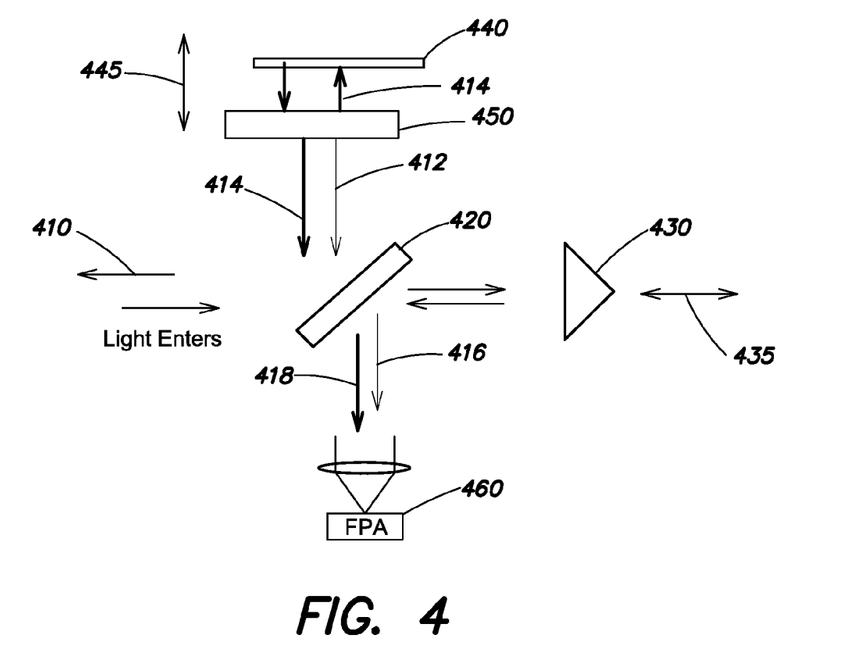
FIG. 4 is a block diagram of one example of a configurable spectropolarimeter according to aspects of the invention.

Referring to FIG. 4, there is illustrated a block diagram of one example of an imaging transform spectrometer configured to provide "on demand" polarimetry in accord with certain aspects and embodiments. Light 410, which may be essentially unpolarized, from an external scene enters the spectrometer and is split between two optical paths (two "arms" of the spectrometer) using a beamsplitter 420. Those skilled in the art will appreciate, given the benefit of this disclosure, that the polarization content of the light 410 does not affect aspects and embodiments of the present invention discussed below. The beamsplitter 420 is an optical element configured to allow part of an electromagnetic wave to pass through while reflecting the other part. As discussed above, one arm of the interferometer introduces a variable optical path length through movement of a first movable mirror 430. In one example, lateral movement of the movable mirror 430 along the axis of the corresponding arm, as shown by arrow 435, produces the optical path length difference. The movable mirror scans over a range of movement along the axis indicated by arrow 435, from an initial position to a furthest lateral extent, and back. The movable mirror 430 may be a corner cube, as illustrated in FIG. 4, a plane mirror, or another reflecting device.

The other arm of the spectrometer includes a second mirror 440, and a polarizing beamsplitter 450 that splits the light in that arm into two orthogonally polarized components. In following description, the two orthogonally polarized components will be referred to as vertical polarization and horizontal polarization; however, those skilled in the art will appreciate, given the benefit of this disclosure, that embodiments of the spectrometer may be alternatively configured to split the light into any two orthogonal components (e.g. left-hand and right-hand circularly polarized components.) In the illustrated example, the polarizing beamsplitter 450 is configured to reflect the horizontally polarized component 412 and pass the vertically polarized component 414; however, in other embodiments, the opposite arrangement may be implemented. The vertically polarized component 414 is reflected from the second mirror 440.

Light 416, 418 returned from each arm is directed via the beamsplitter 420 to a focal plane array (FPA) sensor 460, and the beams from each path are recombined at the FPA sensor. The result of the recombination is one or more interferograms produced at the FPA sensor 460. The FPA sensor 460 may include a set of photo-detector elements and corresponding electronics arranged at or near the focus of the interference pattern. For example, the set of photo-detectors elements can be arranged as a linear array or in a two-dimensional matrix.

According to one embodiment, an actuating mechanism, such as a piezoelectric transducer, for example, is coupled to the second mirror 440 and configured to move the second mirror along the axis of its corresponding arm of the spectrometer, as shown by arrow 445. This movement of the second mirror 440 introduces a variable and controllable optical path length difference between the vertical and horizontal polarized components 412, 414 of the light, and also changes the velocity component, V, of Equation (1) for the transmitted component (in the illustrated example, the vertically polarized component 414). The effective mirror velocity for the vertically polarized component 418 is the sum of the two mirror velocities. Thus, given a velocity V1 of the movable mirror 430, and a velocity V2 of the second mirror 440, the frequency bands of interferograms produced at the FPA sensor 460 for the two orthogonal polarizations 416, 418 are given by:

$$f_H = 2\nu V_1 \qquad (2)$$

$$f_V = 2\nu (V_1 + V_2) \qquad (3)$$

where $f_H$ is the frequency band of the interferogram produced for the horizontally polarized component of the light 416 received at the FPA sensor 460, and $f_V$ is the frequency band of the interferogram produced for the vertically polarized component of the light 418.

Figure 5A:
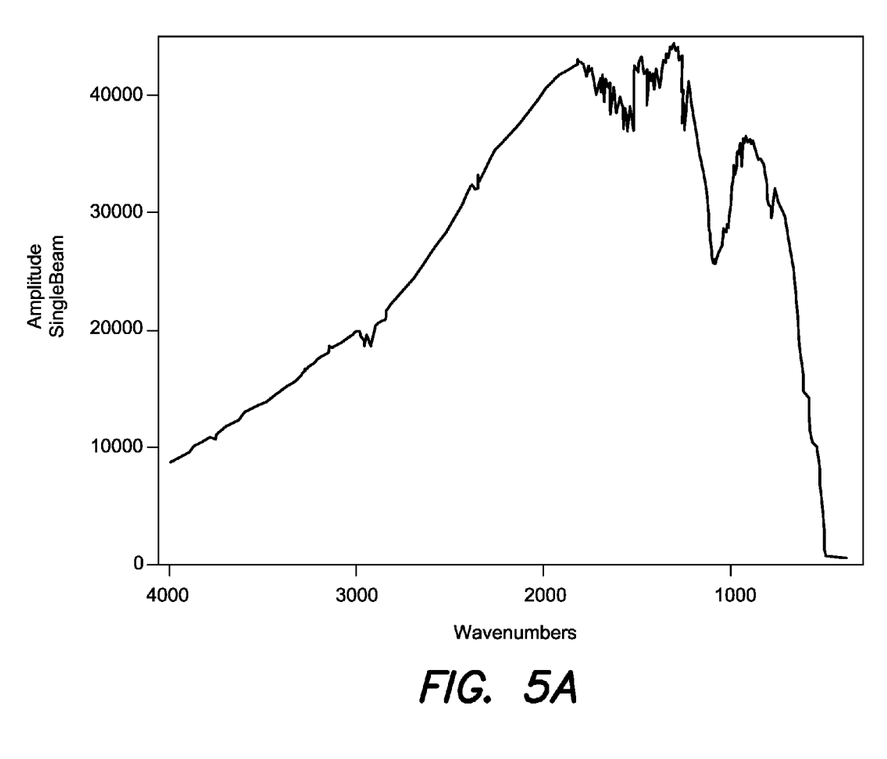
FIG. 5A is a graph showing one example of an interferogram for the vertical polarization produced at the FPA sensor of the configurable spectropolarimeter of FIG. 4.
Figure 5B:
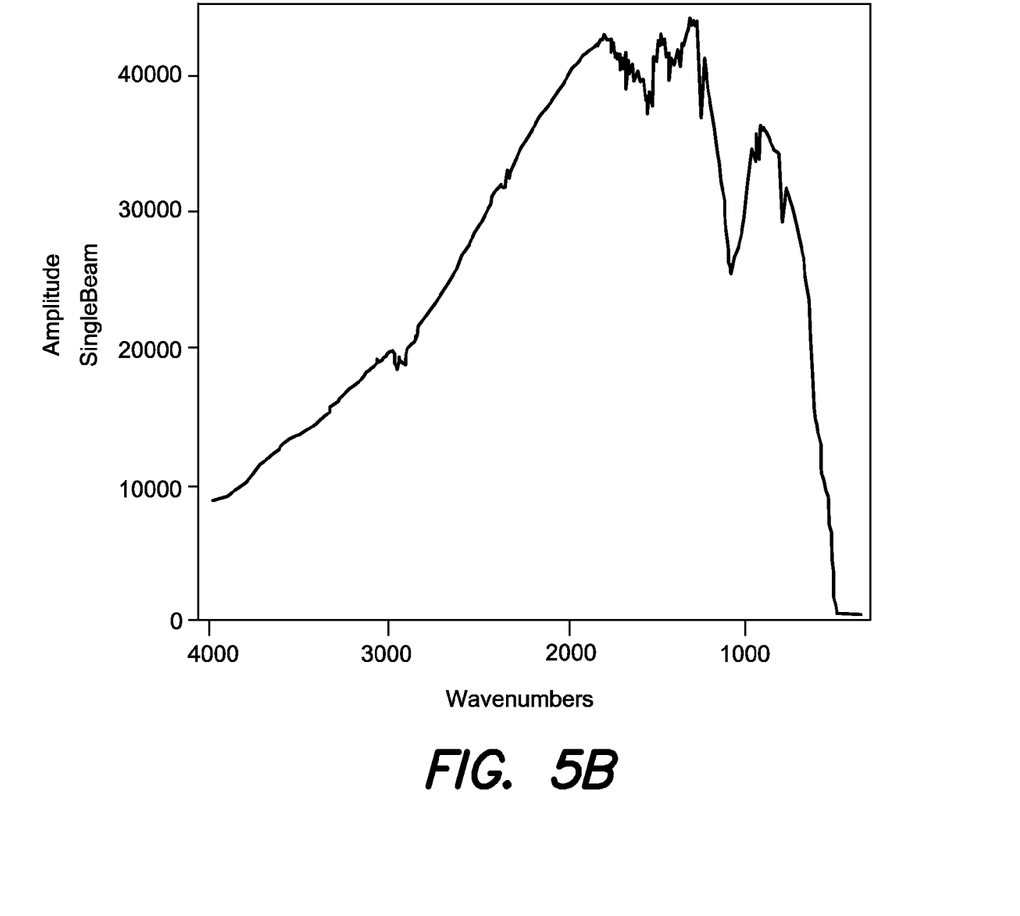
FIG. 5B is a graph showing one example of an interferogram for the horizontal polarization produced at the FPA sensor of the configurable spectropolarimeter of FIG. 4.

For example, consider an input waveband of approximately 8.5-14.3 µm (corresponding to an input wavenumber range of 1200-700 cm$^{-1}$); $V_1$=0.05 cm/s; $V_2$=0.05 cm$^{-1}$/s; a two second scan, a scan resolution of approximately 10 cm$^{-1}$, and a sample rate of greater than 240 Hz. For this example, Equation (2) yields a measured frequency range of approximately 60-35 Hz for the horizontally polarized component, and Equation (3) yields a measured frequency range of approximately 120-70 Hz for the vertically polarized component. FIGS. 5A and 5B illustrate interferograms which may be produced at the FPA sensor 460 for this example. FIG. 5A illustrates an example of the interferogram for the vertical polarization, where the wavenumber range corresponds to a measured frequency range of approximately 120-70 Hz, as discussed above. FIG. 5B illustrates an example of the interferogram for the horizontal polarization, where the wavenumber range corresponds to a measured frequency range of approximately 60-35 Hz, as discussed above.

Thus, the FPA sensor 460 receives two superimposed modulated interferograms where each interferogram is in a unique frequency band; one for the horizontal polarization and one for the vertical polarization. Because the effective mirror velocity is altered only for the vertical polarization (in this case) by the movement of the second mirror 440, the measured frequency ranges for the two polarizations are offset. By controlling the velocity of movement, $V_2$, of the second mirror 440, the amount of frequency offset may be controlled. Thus, by setting $V_2$ to zero, the system may act as a spectral imager (imaging transform spectrometer) only, as the two interferograms (for the two polarizations) produced at the FPA sensor 460 are superimposed having identical frequency bands, as discussed above. By setting $V_2$ to a predetermined value, the system may be dynamically configured to collect spectropolarimetry "on demand."

Figure 6:
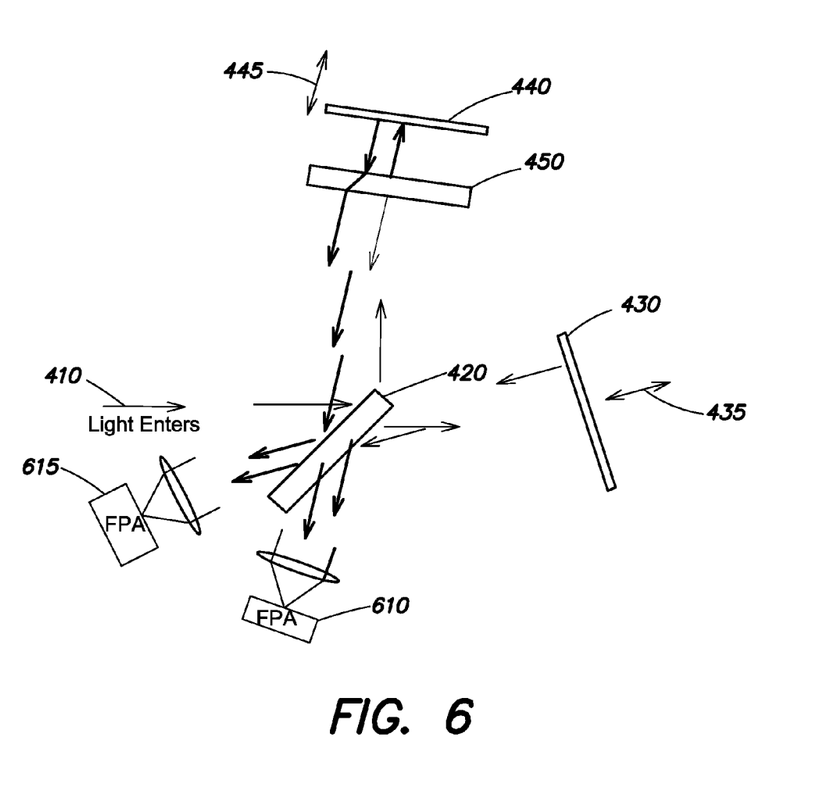
FIG. 6 is a block diagram of one example of a configurable dual-beam spectropolarimeter according to aspects of the invention.

As discussed above, an alternative arrangement of an imaging transform spectrometer includes a pair of FPA sensors that each receives the light from the beamsplitter and produces a corresponding interferogram, as shown in FIG. 1B. Aspects and embodiments may be applied to this type of imaging transform spectrometer to convert the spectral imager into an "on demand" spectropolarimeter, as discussed above. For example, referring to FIG. 6, there is illustrated an example of a configurable spectropolarimeter including two FPA sensors 610, 615, according to one embodiment. Each FPA sensor 610, 615 receives two superimposed modulated interferograms; one for the vertical polarization and one for the horizontal polarization, as discussed above. The difference compared to the embodiment discussed above with reference to FIG. 4, is that instead of light being lost through the beamsplitter 420, out along the input path, the returned light is shared between the two FPA sensors 610, 615. In one example, interleaved sampling between the two FPA sensors 610, 615 may be used to increase the effective sampling rate, as described, for example, in commonly-owned US PG-Pub. No. 2013/0277560, which is herein incorporated by reference in its entirety for all purposes. As with the example described above with reference to FIG. 4, by setting the velocity $V_2$ of motion of the second mirror 440 to zero, the polarimetry function may be turned off, returning operation of the system to that of a spectral imager alone.

According to another embodiment, bandpass filtering of the scene spectrum may be used to decrease the velocity $V_2$ of motion of the second mirror 440, which may be advantageous or desirable in certain applications. For example, referring to FIG. 7, there is illustrated one example of a configurable spectropolarimeter implementing bandpass filtering according to one embodiment. In the illustrated example, a first bandpass filter 710, configured to pass a first range of wavelengths, is positioned in front of the first FPA sensor 610, and a second bandpass filter 715, configured to pass a second range of wavelengths, is positioned in front of the second FPA sensor 615. Splitting the colors (range of frequencies) received by each FPA sensor 610, 615 reduces the bandwidth used by each sensor, and accordingly, allows the velocity $V_2$ of motion of the second mirror 440 to be reduced because the velocity $V_2$ is proportional to the bandwidth (as shown by Equations (1)-(3)). The frequency band received by each FPA sensor 610, 615, and therefore the wavelength passband of the corresponding bandpass filter 710, 715, may be set independently and optimized for a desired sample rate.

Figure 7:
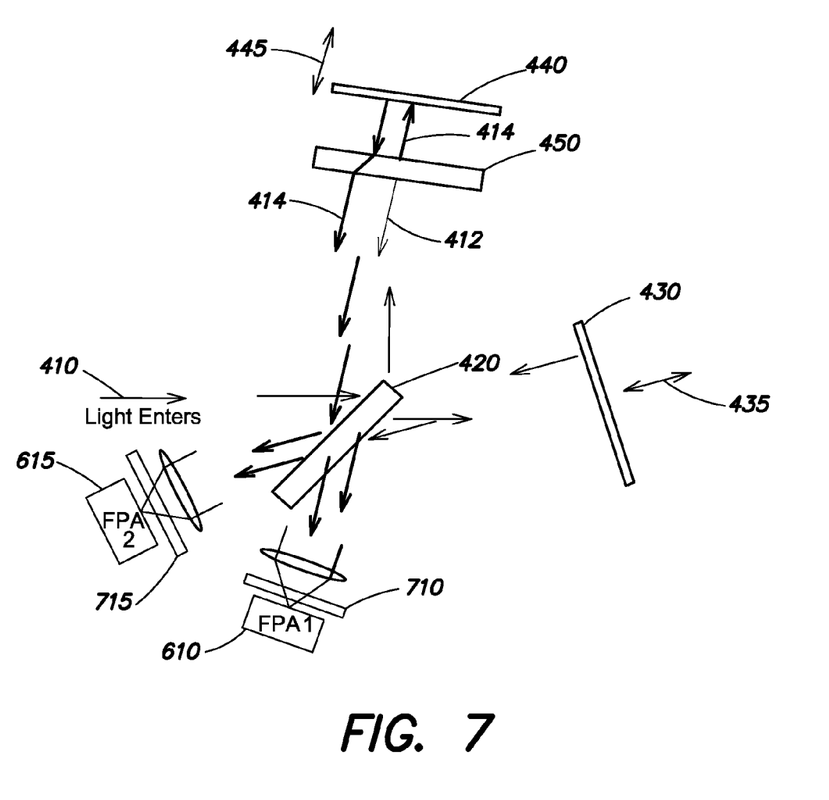
FIG. 7 is a block diagram of another example of a configurable dual-beam spectropolarimeter according to aspects of the invention.

For example, consider an input waveband (for light 410) of approximately 7.7-14.3 µm (corresponding to an input wavenumber range of approximately 1200-700 cm$^{-1}$); $V_1$=0.05 cm/s; a two second scan, and a scan resolution of approximately 10 cm$^{-1}$. Using bandpass filtering, $V_2$ may be reduced to 0.02 cm$^{-1}$/s from 0.05 cm$^{-1}$/s in the example discussed above. For this example, Equation (2) yields a measured frequency range of approximately 60-35 Hz for the horizontally polarized component, and Equation (3) yields a measured frequency range of approximately 84-52.5 Hz for the vertically polarized component.

In one example, the passband for the first bandpass filter 710 may be selected such that the first FPA sensor 610 receives wavenumbers in the range of approximately 940-1200 cm$^{-1}$, and the passband for the second bandpass filter 715 may be selected such that the second FPA sensor 615 receives wavenumbers in the range of approximately 700-960 cm$^{-1}$. Thus, the first FPA sensor 610 may produce an interferogram for the horizontal polarization over a measured frequency range of approximately 47-60 Hz, and an interferogram for the vertical polarization over a measured frequency range of approximately 66-84 Hz. Similarly, the second FPA sensor 615 may produce an interferogram for the horizontal polarization over a measured frequency range of approximately 35-48 Hz, and an interferogram for the vertical polarization over a measured frequency range of approximately 49-67 Hz. Thus, in this example, the total bandwidth of signals on the first FPA sensor 610 is approximately 37 Hz, and the total bandwidth of signals on the second FPA sensor 615 is approximately 32.2 Hz. The frequencies may be extracted from each FPA sensor 610, 615 to reconstruct a composite interferogram for each polarization component, and produce the polarimetry data. In this example, the sampling rate may be reduced to approximately 168 Hz, compared to the 240 Hz sampling rate used in the above-discussed example.

In another embodiment, interleaved sampling may be used, as discussed above. For example, for the above-noted example bandwidths, a sampling rate of 84 Hz may be used for the first FPA sensor 610, and a sampling rate of 67 Hz may be used for the second FPA sensor 615.

In another embodiment, the sampling rate may be the same for both FPA sensors. The sampling rate, $F_s$ may be selected according to the following "bandpass sampling" equations:

$$\frac{2f_H}{k} \leq F_s \leq \frac{2(f_H - B)}{k - 1} \quad (4)$$

$$k \leq \frac{f_H}{B} \quad (5)$$

In Equations (4) and (5), k is any integer that satisfies Equation (5), and B is the bandwidth. Similar equations may constrain $F_s$ for $f_V$. Those skilled in the art will appreciated, given the benefit of this disclosure, that bandpass sampling is separate and independent from the bandpass filtering of the spectrum discussed above; however, in practice it may be easier to apply bandpass sampling when the bandwidth of the signal to be sampled is narrowed by using bandpass filtering.

Figure 8:
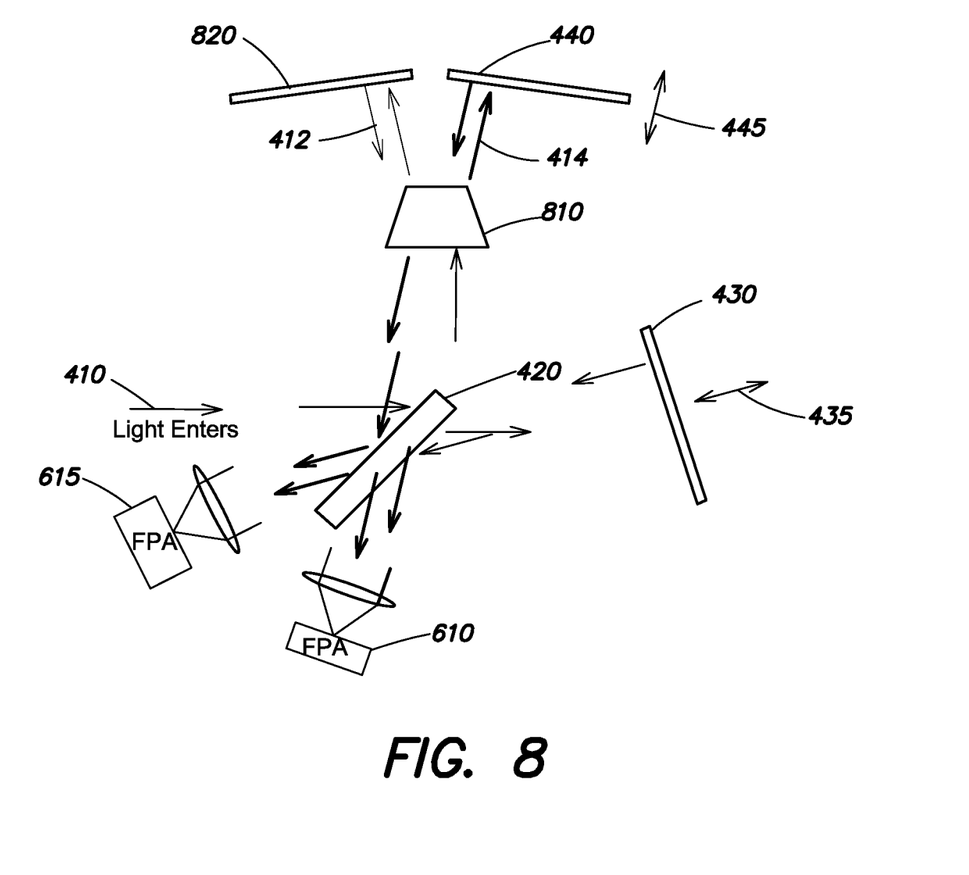
FIG. 8 is a block diagram of another example of a configurable spectropolarimeter using two movable mirrors and a fixed mirror, according to aspects of the invention.

In embodiments discussed above with reference to FIG. 4, the polarizing beamsplitter 450 is configured to reflect the horizontally polarized component 412 and pass the vertically polarized component 414. Referring to FIG. 8, according to another embodiment, the polarizing beam splitter 450 may be replaced with an achromatic polarizing beamsplitter, or Wollaston prism, 810 that passes both polarizations, but directs the two components in slightly different directions. Thus, the vertical polarization 414 may be directed to the second mirror 440 and the horizontal polarization 412 may be directed to a third mirror 820, for example. Both polarizations are reflected from the respective mirrors 440, 820, and returned via the achromatic polarizing beamsplitter 810 and beamsplitter 420 to the FPA sensors 610, 615 and processed as discussed above. The third mirror 820 may be a fixed mirror. Motion of the second mirror 440 (indicated by arrow 445) may introduce an optical path length difference between the vertical and horizontal polarizations 414, 412, thus producing offset frequency ranges in the interferograms of the two polarizations, as discussed above.

Thus, aspects and embodiments provide a configurable spectropolarimeter wherein controlled movement of the second mirror 440 may be selectively activated, to allow the system to collect polarimetry as discussed above, and deactivated to return the system to a spectral imaging mode in which polarimetry is not collected. Dual polarization imagery may be collected on a single FPA sensor. The two polarizations are perfectly registered on each pixel of the sensor, and are collected simultaneously. In certain embodiments, bandpass filtering and/or bandpass sampling may be used, as discussed above. Additionally, in dual-beam configurations with bandpass filtering, bandpass sampling may be used to transition the signals closer to baseband and reduce sampling speed requirements, as well as to allow the same sampling rate to be used for both FPA sensors.

Furthermore, according to certain embodiments, a configurable spectropolarimeter as discussed above may be further configured to implement a camera, or broadband spatial imaging mode. Commonly-owned, co-pending U.S. application Ser. No. 14/166,067, titled "CONFIGURABLE COMBINATION SPECTROMETER AND IMAGER," filed on Jan. 28, 2014, which is herein incorporated by reference in its entirety, describes techniques by which an imaging transform spectrometer may be configured, on demand, into either a spectral imaging mode or a camera mode through purposeful, selective destruction of the interference pattern used for spectral imaging. This may be achieved by selectively halting the scanning motion of the first movable mirror 430, physically modulating one of the two mirrors 430, 440 to destroy the interferogram. Specifically, actuator (such as a piezoelectric transducer, for example) may be coupled to either the first mirror 430 or second mirror 440, and configured to cause the mirror to vibrate rapidly back and forth along the direction of the axis of the respective arm of the interferometer (represented by arrows 435 and 445, respectively), with a small amplitude motion. This vibration causes a frequency shift to the modulation for the radiation striking the mirror 430 or 440, and substantially destroys the interference pattern. Accordingly, the resulting image obtained by the FPA sensor is a broadband image of the scene without modulation. Spectral collection may be interrupted, on demand or at any time, to collect broadband unmodulated images. Thus, according to certain embodiments, an imaging transform spectrometer may be dynamically configured between a spectral imaging mode, a spectropolarimetry mode, and a broadband imaging mode, by controlling the movement of mirrors 430 and 440. In this manner, a highly flexible instrument may be provided, which is capable of being rapidly reconfigured to obtain different types of images and different information from a viewed scene.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A multimode configurable imaging spectropolarimeter comprising:
   a first beamsplitter configured to split incident electromagnetic radiation from a scene into a first optical path and a second optical path and to direct reflected electromagnetic radiation from the first and second optical paths along a combined optical path toward a focal plane;
   a movable first mirror positioned in the first optical path and configured to reflect electromagnetic radiation in the first optical path back toward the first beamsplitter, the first mirror being movable over a first scan range to provide a first optical path length difference between the first optical path and the second optical path;
   a polarizing beamsplitter positioned in the second optical path and configured to split electromagnetic radiation in the second optical path into a first polarization and a second polarization, the first and second polarizations being orthogonal to one another;
   a movable second mirror positioned in the second optical path and configured to reflect the first polarization toward the first beamsplitter, the second mirror being selectively movable over a second scan range to provide a second optical path length difference between the first and second polarizations;
   a fixed third mirror positioned in the second optical path and configured to reflect the second polarization toward the first beamsplitter; and
   at least one imaging sensor positioned at the focal plane and configured to receive the reflected electromagnetic radiation from the first and second optical paths and to produce a first interferogram from interference between the first polarization and the reflected electromagnetic radiation from the first optical path and a second interferogram from interference between the second polarization and the reflected electromagnetic radiation from the first optical path, the second interferogram being superimposed on the first interferogram and offset in frequency relative to the first interferogram.

2. The multimode configurable imaging spectropolarimeter of claim 1, wherein the first interferogram comprises a first range of measured frequencies corresponding to the first polarization and the second interferogram comprises a second range of measured frequencies corresponding to the second polarization, and wherein the first and second ranges of measured frequencies do not overlap.

3. The multimode configurable imaging spectropolarimeter of claim 2, wherein the at least one imaging sensor includes two imaging sensors each configured to receive the reflected electromagnetic radiation from the first and second optical paths.

4. The multimode configurable imaging spectropolarimeter of claim 3, further comprising:
   a first bandpass filter positioned in front of a first one of the two imaging sensors and having a first passband including the first range of measured frequencies; and
   a second bandpass filter positioned in front of a second one of the two imaging sensors and having a second passband including the second range of measured frequencies.

5. The multimode configurable imaging spectropolarimeter of claim 1, wherein the first and second polarizations are vertical polarization and horizontal polarization.

6. The multimode configurable imaging spectropolarimeter of claim 1, further comprising a controller configured to selectively interrupt a scanning movement of the first mirror and the second mirror, and to impart a vibration to one of the first and second mirrors so as to substantially prevent formation of the first and second interferograms at the at least one imaging sensor.

7. An imaging method comprising:
   receiving electromagnetic radiation from a scene with an imaging transform spectrometer;
   splitting the electromagnetic radiation into a first optical path and a second optical path within the imaging transform spectrometer;
   splitting electromagnetic radiation in the second optical path into first and second orthogonal polarizations;
   reflecting the first and second polarizations and electromagnetic radiation from the first optical path to a focal plane;
   selectively producing first and second superimposed interferograms on an imaging sensor positioned at the focal plane by selectively controlling movement of a movable first mirror in the first optical path to produce a first optical path length difference between the first and second optical paths, the first interferogram produced from interference between the first polarization and the electromagnetic radiation reflected from the first optical path, and the second interferogram produced from interference between the second polarization and the electromagnetic radiation reflected from the first optical path;
   selectively producing an offset in frequency between the first and second superimposed interferograms by directing the first polarization to a movable second mirror, and selectively controlling movement of the second mirror in the second optical path to produce a second optical path length difference between the first and second polarizations; and
   configuring the imaging transform spectrometer between a spectral imaging mode and a spectropolarimetric imaging mode by deactivating the movement of the movable first mirror to configure the imaging transform spectrometer into the spectral imaging mode, and activating the movement of the movable first mirror to configure the imaging transform spectrometer into the spectropolarimetric imaging mode.

8. The imaging method of claim 7, further comprising:
   configuring the imaging transform spectrometer into a broadband spatial imaging mode by:
      deactivating the movement of the movable first mirror;
      deactivating the movement of the movable second mirror; and
      imparting a vibration to one of the movable first mirror and the movable second mirror to substantially prevent formation of the first and second interferograms at the at least one imaging sensor.

9. The imaging method of claim 7, wherein splitting the electromagnetic radiation in the second optical path into the first and second orthogonal polarizations includes splitting the electromagnetic radiation in the second optical path into a vertical polarization component and a horizontal polarization component.

10. The imaging method of claim 7, wherein splitting the electromagnetic radiation in the second optical path into the first and second orthogonal polarizations includes:

reflecting the second polarization from a polarizing beamsplitter; and transmitting the first polarization through the polarizing beamsplitter to the movable second mirror; and wherein selectively producing the offset in frequency further includes reflecting the first polarization with the movable second mirror.

11. The imaging method of claim 7, wherein splitting the electromagnetic radiation in the second optical path into the first and second orthogonal polarizations includes:

directing the first polarization to the movable second mirror using a polarizing beamsplitter;

directing the second polarization to a fixed third mirror; and reflecting the second polarization with the fixed third mirror.

12. The imaging method of claim 7, wherein the first interferogram comprises a first range of measured frequencies and the second interferogram comprises a second range of measured frequencies, and wherein selectively producing the offset in frequency includes producing a sufficient offset in frequency such that the first and second ranges of measured frequencies do not overlap.

13. A multimode configurable imaging spectropolarimeter comprising:

a first beamsplitter configured to split incident electromagnetic radiation from a scene into a first optical path and a second optical path and to direct reflected electromagnetic radiation from the first and second optical paths along a combined optical path toward a focal plane;

a movable first mirror positioned in the first optical path and configured to reflect electromagnetic radiation in the first optical path back toward the first beamsplitter, the first mirror being movable over a first scan range to provide a first optical path length difference between the first optical path and the second optical path;

a polarizing beamsplitter positioned in the second optical path and configured to split electromagnetic radiation in the second optical path into a first polarization and a second polarization, the first and second polarizations being orthogonal to one another, the polarizing beamsplitter being further configured to transmit the first polarization and to reflect the second polarization toward the first beamsplitter;

a movable second mirror positioned in the second optical path and configured to reflect the first polarization toward the first beamsplitter, the second mirror being selectively movable over a second scan range to provide a second optical path length difference between the first and second polarizations;

at least one imaging sensor positioned at the focal plane and configured to receive the reflected electromagnetic radiation from the first and second optical paths and to produce a first interferogram from interference between the first polarization and the reflected electromagnetic radiation from the first optical path and a second interferogram from interference between the second polarization and the reflected electromagnetic radiation from the first optical path, the second interferogram being superimposed on the first interferogram and offset in frequency relative to the first interferogram; and a controller configured to selectively interrupt a scanning movement of the first mirror and the second mirror, and to impart a vibration to one of the first and second mirrors so as to substantially prevent formation of the first and second interferograms at the at least one imaging sensor.

14. The multimode configurable imaging spectropolarimeter of claim 13, wherein the first and second polarizations are vertical polarization and horizontal polarization.

15. The multimode configurable imaging spectropolarimeter of claim 13, wherein the first interferogram comprises a first range of measured frequencies corresponding to the first polarization and the second interferogram comprises a second range of measured frequencies corresponding to the second polarization, and wherein the first and second ranges of measured frequencies do not overlap.

16. The multimode configurable imaging spectropolarimeter of claim 15, wherein the at least one imaging sensor includes two imaging sensors each configured to receive the reflected electromagnetic radiation from the first and second optical paths.

17. The multimode configurable imaging spectropolarimeter of claim 16, further comprising:

a first bandpass filter positioned in front of a first one of the two imaging sensors and having a first passband including the first range of measured frequencies; and a second bandpass filter positioned in front of a second one of the two imaging sensors and having a second passband including the second range of measured frequencies.

* * * * *